A. H. LORTON.
Blackboard-Holder.
No. 212,612. Patented Feb. 25, 1879.
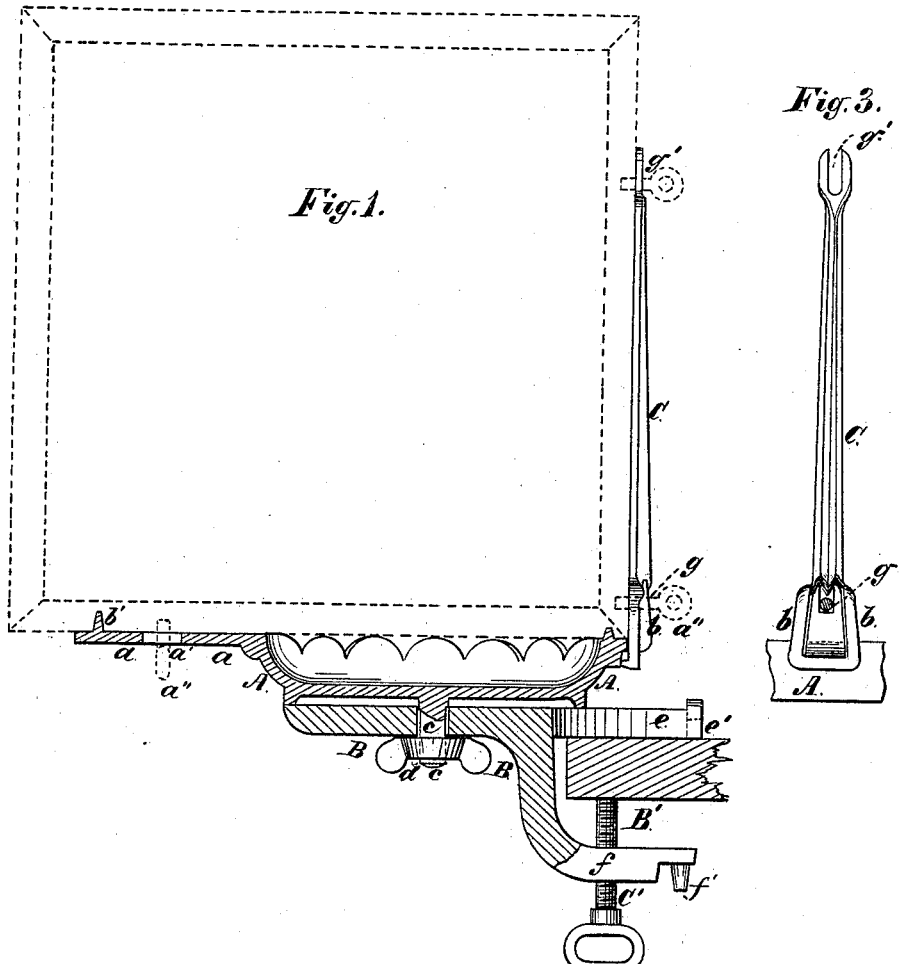
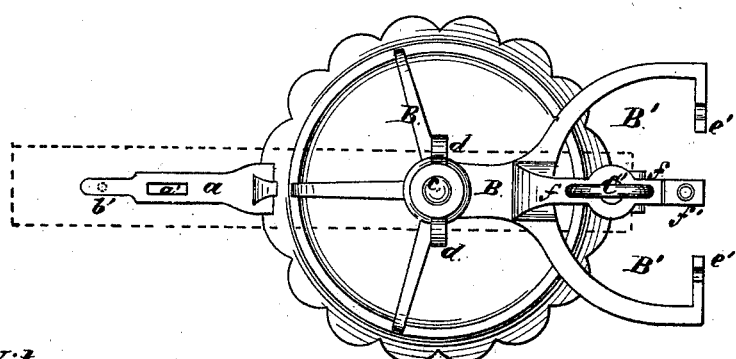
Witnesses:
Henry Eichling
H. Wells Jr
Inventor:
Alfred H. Lorton
per James A. Whitney
Atty

UNITED STATES PATENT OFFICE.

ALFRED H. LORTON, OF NEW YORK, N. Y.

IMPROVEMENT IN BLACKBOARD-HOLDERS.

Specification forming part of Letters Patent No. 212,612, dated February 25, 1879; application filed November 27, 1878.

*To all whom it may concern:*

Be it known that I, ALFRED H. LORTON, of the city, county, and State of New York, have invented certain Improvements in Adjustable Brackets for Blackboards, Slates, &c., of which the following is a specification:

This invention is designed to replace the ordinary cumbrous easel used for supporting blackboards and the like, and which, from its size and structure, occupies much room and is much in the way, especially when not in use.

This invention comprises certain novel combinations of parts, whereby is provided a bracket capable of being readily attached to a table or to a wall, and of being adjusted at will to bring the blackboard, slate, or similar article supported thereby into any convenient or desired position, the apparatus embraced in the said invention, moreover, enabling both sides of a blackboard or slate to be used at the same time, and also, when not in use, being capable of being detached from the table or wall, as the case may be, taken apart, and packed away within an extremely small space.

Figure 1 is a side view and partial vertical section of a bracket made according to my invention. Fig. 2 is a plan view of the same, and Fig. 3 is an edge view of one part thereof.

A is a plate, axially adjustable, as hereinafter set forth, and preferably cup-shaped in its upper side, to provide a receptacle for crayons and other usual adjuncts of a blackboard or of a slate. From one side of this plate A projects a horizontal arm, $a$, provided with a vertical slot, $a'$, and an upwardly-projecting stud, $b'$. At the opposite side of this plate is a dovetail socket, $b$. This plate A is supported upon a base-plate, B, which may be of skeleton form, as shown in Fig. 2, and has a downwardly-projecting screw, $c$, which passes down through a suitable hole in the base-plate B, and has upon its lower part a nut, $d$. By loosening the nut $d$ the plate A may be turned axially to any extent desired, and by again tightening the said nut said plate may be rigidly fixed and retained in the position to which it has been turned.

The base-plate B is provided with a clamp, B', and screw C', by which it may be quickly attached to the edge of a bench or table or other like support.

In the upper jaws, $e$, of the clamp are downwardly-projecting studs $e'$, and upon the lower jaw, $f$, of said clamp is also a like downwardly-projecting stud, $f'$. These adjuncts of the clamp permit the apparatus to be suspended upon a suitably-arranged system of staples when it is desired that the bracket be attached to a wall.

C is a detachable bar, the lower end of which is so shaped as to be first thrust downward through the dovetail socket $b$, from the inside thereof, and, by bringing the bar to an upright position, forcing the said lower end of the bar into the socket, (the said part of the bar being of a shape coincident with that of the socket,) so that the bar is interlocked with the socket, and thus attached to the plate A.

At $g$ in the bar C is a hole, through which a screw may be passed, and in the upper end of said bar is a deep notch or slot, $g'$.

In order to attach a blackboard, a slate, or other like article to the bracket, the article is placed in the position shown by the dotted outline in the drawings, a small staple in the frame of the article being passed through the slot $a'$ in the arm $a$, and then turned with its oblong head transverse to the said slot, so as to lock the article against an upward movement away from its support. A screw, as shown in dotted outline at $a''$, is passed through the hole $g$, and screwed into the frame or edge of the said article, said screw not only attaching the adjacent corner of the article to the bracket, but also more rigidly fixing the attachment of the bar C to the plate A. An oblong-headed screw provided in the edge of the article is passed into the notch or slot $g'$ in the upper end of the bar C, and, being tightened with its head across the said slot, firmly attaches the adjacent corner of the article to said upper end of the said bar. The stud $b'$, being forced into the lower edge of the article, assists in holding the latter firmly in position.

It will be seen that the article, (a blackboard, slate, or the like,) being thus affixed on the bracket, has its two sides equally displayed for use, so that two persons may use the same at one and the same time; further, that by simply adjusting the plate A, as hereinbefore set forth, the blackboard, slate, or other like article may be brought into any position (consistent with its remaining upright) which may be desired in the use thereof—as, for example, to adjust it to the direction from which the light is derived.

What I claim as my invention is—

1. The plate A, constructed with the axial retaining-screw $c$, nut $d$, and a device, $a$, for attachment to a blackboard or the like, in combination with the horizontal base-plate B, constructed with a clamp for attachment to the edge of a table or similar support, substantially as and for the purpose specified.

2. The combination of the plate A, having the arm $a$ and dovetail socket $b$, the bar C, and the base-plate B, having a clamp, B′, substantially as and for the purpose herein set forth.

3. The bar C, constructed with the hole $g$ and notch or slot $g'$, in combination with the axially-adjustable plate A, having the dovetail socket $b$, and the base-plate B, substantially as and for the purpose herein set forth.

ALFRED H. LORTON.

Witnesses:
H. WELLS, JR.,
HENRY EICHLING.